United States Patent Office 3,631,207
Patented Dec. 28, 1971

3,631,207
TRI- AND TETRACHLOROETHYLENE PROCESS
Charles E. Kircher, Jr., Detroit, Donald R. McAlister, Livonia, and Doris LeRoy Brothers, Inkster, Mich., assignors to Detrex Chemical Industries, Inc., Detroit, Mich.
No Drawing. Filed July 14, 1966, Ser. No. 565,095
Int. Cl. C07c 21/04
U.S. Cl. 260—654 D
11 Claims

ABSTRACT OF THE DISCLOSURE

Processes are disclosed for producing trichloroethylene, tetrachloroethylene or mixtures thereof by dehydrochlorination of polychlorinated saturated ethanes or mixtures thereof while in the liquid state under positive pressure and elevated temperatures and in the presence of activated carbon. The reaction products are removed from the reaction zone as vapors.

---

This invention relates to a method for the dehydrochlorination of tetrachloroethanes, pentachloroethane or mixtures thereof in the liquid phase, to form trichloroethylene, tetrachloroethylene or mixtures thereof while simultaneously producing hydrogen chloride in recoverable form. In all cases the chlorine atoms in the starting materials of this invention are attached to primary carbon atoms.

One of the known methods for dehydrochlorinating polychlorinated ethanes consists of subjecting such compounds to a pyrolytic reaction in which they are heated to a temperature which is sufficiently high to cause dissociation into chlorinated olefin compounds and hydrogen chloride. Such high temperature pyrolytic reactions usually involve passing a heated vapor over a heated bed as in the case of British Pat. No. 697,482, but it has also been proposed to use a heated surface immersed in a liquid chlorinated hydrocarbon as in the case of British Pat. No. 774,125. In either case, an elevated temperature of the order 400°–1200° C. at the reaction surface is relied upon for the pyrolytic dehydrochlorination reaction. Somewhat lower reaction temperatures are possible by dehydrochlorination in the vapor phase using a bed made up of activated carbon as in the case of U.S. Pat. No. 2,898,383.

An alternative dehydrochlorination method, which has been known for a long time and which has been widely practiced commercially, comprises reacting chlorinated ethanes with an inorganic alkaline chemical, such as lime, or with organic bases, such as alkyl amines.

The use of metal chlorides has also been proposed for some dehydrochlorination reactions, but these reactions have not included the commercial production of trichloroethylene and/or perchloroethylene because of undesirable side reactions.

While the known methods for dehydrochlorinating polychlorinated ethanes are capable of producing chlorinated ethylene products, they have certain inherent disadvantages. In the pyrolytic methods, the by-products formed during pyrolysis are carbonized at the elevated temperature of the reactor and this reduces the effectiveness of the reaction surface, thus requiring the use of even more heat until finally the reactor must be taken out of service and the contaminated reaction surface cleaned. Moreover, it is difficult to prevent decomposition of the desired dehydrochlorinated product within the reaction zone through over-pyrolysis.

In the methods involving chemical dehydrochlorination by inorganic alkaline chemicals or organic bases, the hydrogen chloride which is split off reacts with the inorganic alkaline chemical to form a chloride salt or reacts with the organic base to form a hydrochloride salt. Consequently the hydrogen chloride is not recovered in a useful form. A further disadvantage in the use of organic bases, such as triethylamine or quinoline, arises from the fact that some of the organic base is continuously lost in the reaction and such organic bases are expensive. Consequently their use in dehydrochlorination reactions is not economically feasible. Moreover, where strong alkaline chemicals are used, further dehydrochlorination of the products may occur and this is particularly undesirable. In the present invention the disadvantages present in the prior known dehydrochlorination methods applicable to polychlorinated ethanes have been overcome in a controlled process which is capable of producing predetermined desired chlorinated ethylene products together with hydrogen chloride in recoverable form from compounds selected from the group consisting of tetrachloroethanes and pentachloroethane or mixtures thereof at a cost which is competitive with any method now in commercial use for producing the corresponding dehydrochlorinated ethylenes, namely, trichloroethylene and tetrachloroethylene.

One of the objects of the present invention is to provide a process for producing trichloroethylene or tetrachloroethylene or mixtures thereof from symmetrical tetrachloroethane (1,1,2,2), asymmetrical tetrachloroethane (1,1,1,2), pentachloroethane or mixtures thereof while at the same time producing hydrogen chloride in recoverable form.

A further object of this invention is to provide a process for producing trichloroethylene or tetrachloroethylene or mixtures thereof from the above-mentioned polychlorinated ethanes wherein the dehydrochlorination process is carried out with the polychlorinated compound or compounds being maintained under pressure in liquid phase and with the dehydrochlorination products being evolved within the liquid phase and passing out of the system through the liquid phase as gases.

A still further object is to provide a process for producing trichloroethylene or tetrachloroethylene or mixtures thereof through a controlled dehydrochlorination of a liquid polychlorinated ethane mixture of tetrachloroethanes or pentachloroethane, or both, maintained under a predetermined pressure and temperature, such as to produce in good yields the desired chlorinated ethylene products and HCl.

We have discovered that the objects set forth above are attained by a controlled process in which the polychlorinated saturated ethanes referred to above are maintained in liquid phase and under a pressure substantially in excess of atmospheric in the presence of activated carbon immersed therein, while supplying heat to control the temperature of the liquid substantially above the temperature at which HCl is evolved but below 300° C. The process can be carried out as a continuous process or as a batch process. By selecting the proper liquid phase composition containing predominantly the above-mentioned chlorinated ethane or ethanes and a feed stock composed of these chlorinated compounds and by maintaining a predetermined temperature and a predetermined pressure, the process continuously produces a preselected chlorinated ethylene product or products and HCl in recoverable form. In the case of tetrachloroethanes and pentachloroethane this provides the great advantage of being able to operate the process to produce predominantly trichloroethylene or predominantly tetrachloroethylene or a mixture thereof in a predetermined ratio. Likewise, the process has the flexibility of operating on mixtures of polychlorinated ethanes or on individual polychlorinated ethanes.

In accordance with the present invention, the polychlorinated ethane is admixed with carbon and subjected to liquid phase dehydrochlorination at temperatures of about 150° C. to below 300° C., more preferably 170° C. to 275° C., and most preferably 190° C. to 250° C.

It is important in the practice of the present process that the dehydrochlorination be carried out at temperatures from about 150° C. to below about 300° C. In systems involving the dehydrochlorination of tetrachloroethanes and pentachloroethane, severe catalyst deactivation takes place at temperatures exceeding about 300° C., the deactivation being more severe the higher the temperature.

Surprisingly, the reaction of this invention is readily accomplished at temperatures below 300° C., even though the dehydrochlorination of compounds having chlorine attached to a primary carbon atom is involved. In this regard, the art teaches that with higher monochlorinated alkanes primary chlorides will not dehydrochlorinate except at temperatures in excess of 300° C. Contrary to such teachings, the compounds having chlorine substituted on a primary carbon atom which are reacted in accordance with the process of the present invention have been found to undergo dehydrochlorination readily and conveniently in liquid phase at much lower temperatures. An outstanding advantage resulting from this is that catalyst life is improved.

During the dehydrochlorination, vapors comprising the polychlorinated ethane together with the dehydrochlorination products are evolved and are removed from the reaction zone.

It has been found that by operating in the prescribed manner outstanding results are achieved. Exceedingly high reaction selectivities at good reaction rates are attained while at the same time process costs are minimized and catalyst life is extended.

It is to be noted by way of contrast that in the previous vapor phase technology such reaction system control could not be achieved except in a limited way by decrease in process conversion.

In addition to the above, practice of the invention has other advantages as follows:

By carrying out the dehydrochlorination from a liquid phase rather than a vapor phase, the size of reactor required is greatly reduced and the necessity of vaporizing and preheating the feed stream is avoided. This represents a saving in both investment cost and operating cost.

Since the dehydrochlorination reaction is endothermic and cannot proceed at a rate faster than the required heat can be supplied, a great advantage arises by operating with a liquid phase rather than a vapor phase since much higher rates of heat transfer into the liquid phase can be obtained.

By dehydrochlorinating from a liquid phase, it is necessary to operate under a total pressure greater than the vapor pressure of the liquid phase at the temperature of operation. Through the use of such operating pressures, the HCl formed as a result of the dehydrochlorination reaction is automatically available at the pressure of operation. This makes possible the removal and recovery of organic vapors from the HCl by condensing them in a water or brine cooled condenser and makes available a purified HCl supply for industrial use at moderate to high pressure without the need for compression.

In carrying out the present invention, high concentrations of the polychlorinated ethane and relatively low chlorinated ethylene product concentrations are maintained in the liquid phase. This means that the activated carbon is used to better advantage since the active surface of the carbon is in contact with the saturated compound to be dehydrochlorinated rather than the unsaturated product compound which requires no further activation.

A very important technical and economic advantage is that it is possible to add and remove incremental quantities of activated carbon to the system without interrupting the continuous operation of the process. This capability is generally not present in the prior art vapor phase carbon catalyzed processes. Since there is a gradual loss of activity of activated carbon during use in dehydrochlorination reactions, ultimate replacement of the carbon is necessary. The ability to add and remove carbon while operating, and thereby maintain catalyst efficiency at a more or less constant level, has both technical and economic advantage over the prior art processes in which carbon efficiency steadily declines during its operating life.

The activated carbons used commercially in vapor phase dehydrochlorination processes consist of particles which, in most cases, would not pass through a U.S. standard 20 mesh screen. In order to minimize pressure drop across the catalyst in a fixed bed vapor phase reactor, the size of the carbon particles used is such that they would not pass through a U.S. standard 10 mesh screen. Since practically all of the active catalyst surface is associated with the extremely small diameter pores of the carbon structure which lie below the surface of the particle, it is necessary for the feed and product components to diffuse into and out of the pores of the carbon as the dehydrochlorination reaction proceeds. This vapor phase diffusion into and out of the pores of the carbon is one of the rate limiting factors of the operation. This serious limitation is almost completely obviated in the present process since, by dehydrochlorinating in the liquid phase, the activated carbon catalyst can be finely divided so as to pass through a U.S. standard screen of 325 mesh or finer, without any disadvantage from a handling point of view. For a given weight of carbon, the smaller the particle size, the greater is the exposed surface area and molecules can diffuse into the internal pores of the carbon. Also, by placing the activated carbon in the liquid phase, under moderate to high pressure, there is a positive driving force which tends to keep all of the pores of the carbon filled with the liquid to be dehydrochlorinated. A maximum use of the catalytic surface of the carbon is thereby realized in the new process.

The following examples are set forth as illustrative of the process of the present invention. They are intended to serve merely as examples thereof since many other conditions of operation would come within the scope of the present invention as hereinafter defined in the claims.

EXAMPLE 1

Dehydrochlorination of symmetrical tetrachloroethane

A stainless steel pressure vessel having a charge port and vapor take-off was fitted with a thermowell and thermostat and the vessel was positioned within an electrically heated mantle controlled by the thermostat. Into the pressure vessel about 50 grams of activated carbon of particle size 4 x 10 mesh were placed followed by about 1500 grams of s-tetrachloroethane (1,1,2,2). The vessel was then purged with nitrogen to displace the air. A product take-off line which contained therein an automatic pressure control means including a control valve was then connected to the product vapor take-off port. The product take-off line was extended to an absorption system for recovery of the dehydrochlorinated organic product and HCl. Heat was then applied to the mantle to bring the liquid symmetrical tetrachloroethane to a temperature of 225° C. During the heating the pressure was permitted to increase to 127 pounds per square inch absolute (p.s.i.a.). The heating mantle and the automatic pressure controller were adjusted to maintain this temperature and pressure and to supply heat for dehydrochlorination. While operating under these conditions the liquid phase reaction mixture was found to have about 8% by weight trichloroethylene, which percentage remained substantially the same throughout the dehydrochlorination reaction. The off gases were absorbed and condensed for analysis of the HCl and organics. These were found to be HCl and trichloroethylene in substantially equi-molar quantities plus tetrachloroethane. Under the conditions given about 40% of the off gases by volume consisted of HCl and trichloroethylene. The volume ratio of chlorinated ethylene product to chlorinated ethane in the evolved gases was about 0.35. The off gases were condensed by absorbing the HCl in cold water. The cold water then condensed the organics to a separate liquid phase which was analyzed using standard separation and analytical techniques.

EXAMPLE 2

Dehydrochlorination of asymmetrical tetrachloroethane (1,1,2,2)

The method or Example 1 was carried out using about 1500 grams of 1,1,1,2 tetrachloroethane in place of the 1,1,2,2 tetrachloroethane. However, a pressure of 149 p.s.i.a. was employed while the temperature was maintained at 225° C. These conditions resulted in a liquid phase reaction mixture containing 1,1,1,2 tetrachloroethane and about 8% by weight trichloroethylene. The condensed off gases were found to contain HCl and trichloroethylene in equi-molar quantities and 1,1,1,2 tetrachloroethane. About 35% of the off gases consisted of HCl and trichloroethylene. The volume ratio of trichloroethylene to tetrachloroethane in the evolved vapors was about 0.27.

EXAMPLE 3

Dehydrochlorination of pentachloroethane

The method of Example 1 was carried out using about 1500 grams of pentachloroethane in place of 1,1,2,2 tetrachloroethane. The temperature was maintained at 225° C. and the pressure within the vessel was maintained at 76 p.s.i.a. These conditions resulted in a liquid phase reaction mixture containing about 8% by weight tetrachloroethylene. The volume ratio of tetrachloroethylene to pentachloroethane in the evolved gases was about 0.27 and the off gases were found to contain HCl and tetrachloroethylene in equi-molar quantities and pentachloroethane. About 35% of the off gases consisted of HCl and tetrachloroethylene.

EXAMPLE 4

Dehydrochlorination of a mixture of tetrachloroethanes and pentachloroethane

The method of Example 1 was carried out using about 1500 grams of a liquid mixture comprising 1,1,2,2 tetrachloroethane, 1,1,1,2 tetrachloroethane and pentachloroethane. The temperature was maintained at 225° C. and the pressure was held at 127 p.s.i.a. These conditions resulted in a liquid phase reaction mixture containing approximately 4% by weight of trichloroethylene and 10% by weight of tetrachloroethylene. The evolved gases contained HCl, trichloroethylene, tetrachloroethylene and a mixture of the chlorinated ethanes. The volume ratio of the chlorinated ethylene compounds to the polychlorinated ethanes in the evolved gases was about 0.35. The amount of trichloroethylene by volume was approximately the same as the amount of tetrachloroethylene by volume with the HCl being present in an amount equivalent to one mol for each mol of trichloroethylene and one mol for each mol of tetrachloroethylene.

EXAMPLE 5

Dehydrochlorination of a mixture of tetrachloroethanes and pentachloroethane

The method of Example 4 was carried out at a temperature of 225° C. and the pressure was maintained at 183 p.s.i.a. These conditions resulted in a liquid phase reaction mixture containing about 16% by weight of trichloroethylene and 5% by weight of tetrachloroethylene. The evolved gases contained the chlorinated ethylene compounds and polychlorinated ethanes in a volume ratio of about 0.9.

EXAMPLE 6

Dehydrochlorination of a mixture of tetrachloroethanes and pentachloroethane

The method of Example 4 was carried out at a temperature of 225° C. and a pressure of 166 p.s.i.a. These conditions resulted in a liquid phase reaction mixture containing about 11.5% by weight of trichloroethylene and 11.5% by weight of tetrachloroethylene. The evolved gases contained the chlorinated ethylene compounds and polychlorinated ethanes in a volume ratio of about 1.0.

EXAMPLE 7

Dehydrochlorination of asymmetrical tetrachloroethane

The method of Example 2 was carried out at a temperature of 250° C. and a pressure of 197 p.s.i.a. These conditions resulted in a liquid phase reaction mixture containing about 5% by weight of trichloroethylene. The evolved gases contained trichloroethylene and asymmetrical tetrachloroethane in a volume ratio of about 0.14.

EXAMPLE 8

Dehydrochlorination of asymmetrical tetrachloroethane

The method of Example 2 was carried out at a temperature of 200° C. and a pressure of 155 p.s.i.a. These conditions resulted in a liquid phase reaction mixture containing about 25% by weight of trichloroethylene. The evolved gases contained trichloroethylene and asymmetrical tetrachloroethane in a volume ratio of about 1.1.

EXAMPLE 9

Dehydrochlorination of pentachloroethane

The method of Example 3 was carried out at a temperature of 200° C. and a pressure of 43 p.s.i.a. These conditions resulted in a liquid phase reaction mixture containing about 5% by weight of tetrachloroethylene. The evolved gases contained tetrachloroethylene and pentachloroethane in a volume ratio of about 0.15.

EXAMPLE 10

Dehydrochlorination of pentachloroethane

The method of Example 3 was carried out at a temperature of 250° C. and a pressure of 179 p.s.i.a. These conditions resulted in a liquid phase reaction mixture containing about 26% by weight of tetrachloroethylene. The evolved gases contained tetrachloroethylene and pentachloroethane in a volume ratio of about 1.0.

EXAMPLE 11

Dehydrochlorination of a mixture of symmetrical and asymmetrical tetrachloroethanes The method of Example 1 was carried out using about 1500 grams of a mixture of 1,1,2,2 tetrachloroethane and 1,1,1,2 tetrachloroethane in equal amounts by weight in place of the 1,1,2,2 tetrachloroethane of Example 1. The temperature was maintained at 225° C. and a pressure of 172 p.s.i.a. was maintained. These conditions resulted in a liquid phase reaction mixture containing about 15% by weight of trichloroethylene. The evolved gases contained trichloroethylene and tetrachloroethanes in a volume ratio of about 0.6.

From the above examples, it will be seen that the weight percentage of the chlorinated ethylene products in the liquid phase undergoing dehydrochlorination may be controlled in the practice of the process of the present invention by means of the temperature-pressure relationship. This provides great flexibility to the process since there is an optimum weight percentage for a given dehydrochlorination reaction, and we have found there is an optimum range of such weight percentage in the production of both trichloroethylene and tetrachloroethylene. For trichloroethylene and tetrachloroethylene, this relationship between pressures and temperatures for various weight percentages is illustrated in the following tables.

TABLE I

Dehydrochlorination of tetrachloroethanes to trichloroethylene

| Operating temperature, °C. | Operating pressure, p.s.i.a. | Vapor ratio trichloroethylene/ tetrachloroethanes | Liquid composition (organics), weight percent | |
|---|---|---|---|---|
| | | | Trichloroethylene | Tetrachloroethanes |
| 190 | 67 | 0.21 | 5 | 95 |
| 190 | 82 | 0.44 | 10 | 90 |
| 190 | 98 | 0.69 | 15 | 85 |
| 190 | 113 | 0.98 | 20 | 80 |
| 190 | 128 | 1.32 | 25 | 75 |
| 190 | 142 | 1.68 | 30 | 70 |
| 200 | 79 | 0.20 | 5 | 95 |
| 200 | 97 | 0.42 | 10 | 90 |
| 200 | 115 | 0.66 | 15 | 85 |
| 200 | 132 | 0.94 | 20 | 80 |
| 200 | 149 | 1.26 | 25 | 75 |
| 200 | 165 | 1.61 | 30 | 70 |
| 225 | 122 | 0.18 | 5 | 95 |
| 225 | 148 | 0.39 | 10 | 90 |
| 225 | 174 | 0.62 | 15 | 85 |
| 225 | 199 | 0.87 | 20 | 80 |
| 225 | 223 | 1.17 | 25 | 75 |
| 225 | 246 | 1.49 | 30 | 70 |
| 250 | 185 | 0.17 | 5 | 95 |
| 250 | 221 | 0.35 | 10 | 90 |
| 250 | 256 | 0.56 | 15 | 85 |
| 250 | 290 | 0.79 | 20 | 80 |
| 250 | 324 | 1.06 | 25 | 75 |
| 250 | 356 | 1.35 | 30 | 70 |

TABLE II

Dehydrochlorination of pentachloroethane to tetrachloroethylene

| Operating temperature, °C. | Operating pressure, p.s.i.a. | Vapor ratio tetrachloroethylene/ pentachloroethane | Liquid compositions (organics), weight percent | |
|---|---|---|---|---|
| | | | Tetrachloroethylene | Pentachloroethane |
| 190 | 36 | 0.16 | 5 | 95 |
| 190 | 43 | 0.34 | 10 | 90 |
| 190 | 50 | 0.54 | 15 | 85 |
| 190 | 56 | 0.77 | 20 | 80 |
| 190 | 62 | 1.01 | 25 | 75 |
| 190 | 69 | 1.31 | 30 | 70 |
| 200 | 43 | 0.16 | 5 | 95 |
| 200 | 51 | 0.33 | 10 | 90 |
| 200 | 59 | 0.53 | 15 | 85 |
| 200 | 66 | 0.75 | 20 | 80 |
| 200 | 74 | 0.99 | 25 | 75 |
| 200 | 81 | 1.28 | 30 | 70 |
| 225 | 67 | 0.15 | 5 | 95 |
| 225 | 80 | 0.32 | 10 | 90 |
| 225 | 92 | 0.52 | 15 | 85 |
| 225 | 104 | 0.73 | 20 | 80 |
| 225 | 115 | 0.97 | 25 | 75 |
| 225 | 126 | 1.25 | 30 | 70 |
| 250 | 104 | 0.15 | 5 | 95 |
| 250 | 122 | 0.32 | 10 | 90 |
| 250 | 141 | 0.51 | 15 | 85 |
| 250 | 158 | 0.72 | 20 | 80 |
| 250 | 175 | 0.95 | 25 | 75 |
| 250 | 192 | 1.22 | 30 | 70 |

The above data demonstrate that by varying reaction conditions the ratio of chlorinated ethylene product to polychlorinated ethane in the evolved vapors is varied as is the liquid composition. Generally speaking, when conditions are varied to provide the lower ratios, less efficient heat utilization results and process costs tend to increase. At the higher ratios, costs tend to rise due to lessened efficiency in the use of the activated carbon. As hereinabove described, mol ratios of chlorinated ethylene compound to polychlorinated ethane in the gases evolved from the dehydrochlorination reaction should be from about 0.01 to about 100, preferably from about 0.05 to about 50, and most preferably from about 0.1 to about 10.

Maintenance of a specified ratio of unsaturated product to polychlorinated ethane in the evolved vapor in turn results in maintaining a certain optimum concentration of unsaturated product in the liquid phase.

For convenience and clarity, the present invention has been illustrated in the above examples as running continuously from a fixed initial charge of starting material which is used up as the dehydrochlorination process proceeds. In actual commercial operation the process may proceed in the same manner but the feed material is continuously introduced into the reaction vessel at a rate corresponding to the rate of dehydrochlorination. A small amount of reaction mixture containing suspended used carbon is periodically withdrawn from the reactor and is replaced by new activated carbon which may be added with the incoming feed or may otherwise be introduced into the reaction vessel.

The following example is illustrative of the commercial continuous process referred to above.

EXAMPLE 12

Continuous process dehydrochlorination of tetrachloroethanes-pentachloroethane mixture A steel pressure vessel having a heating jacket and an internal agitator is charged with a mixture of tetrachloroethanes (20 mol percent 1,1,2,2 tetrachloroethane, 20 mol percent 1,1,1,2 tetrachloroethane), 33 mol percent pentachloroethane, 15 mol percent trichloroethylene and 12 mol percent tetrachloroethylene to which there is added about 5% by weight activated carbon 325 mesh. The steel pressure vessel has a liquid inlet, a liquid draw-off and a single vapor draw-off leading to a cooler-condenser and a pressure reducer. Heat is supplied through the heating jacket until the reaction mixture is heated to 225° C. and the pressure is permitted to rise to an operating pressure of 166 p.s.i.a. This pressure is maintained by an automatic control valve in the vapor draw-off line which permits the escape of cooled effluent gas. The gas stream entering the cooler-condenser has a composition of 0.33 mol fraction HCl, 0.24 mol fraction trichloroethylene, 0.09 mol fraction tetrachloroethylene and 0.34 mol fraction polychlorinated ethanes. In the cooler-condenser organics are condensed.

After separation from the HCl stream, the condensed organics are separated by fractionation, polychlorinated ethylene product is recovered and the polychlorinated ethanes are returned to the reaction vessel through the liquid inlet. For each 100 pounds of polychlorinated ethylenes produced, a portion of the reactor fluid is removed through a pressure control valve positioned in the liquid draw-off line. The volume thus withdrawn is the volume calculated to contain one-fourth pound of activated carbon for each one hundred pounds of chlorinated ethylenes produced. After separation from the liquid the carbon may be discared. A corresponding weight of fresh activated carbon is introduced into the pressure vessel through the liquid inlet. The liquid portion is stripped to separate the lights from the heavies (molecular weight above pentachloroethane). The lights are returned to the reactor. Liquid feed made up of new feed and recycled polychlorinated ethanes is added at a rate corresponding to the dehydrochlorination rate and in proportion to the trichloroethylene and tetrachloroethylene being produced. Heat is supplied through the jacket at a rate sufficient to maintain the system temperature substantially constant at 225° C. while also supplying the heat for maintaining the dehydrochlorination reaction as measured by the effluent stream. The process thus provides HCl, trichloroethylene and tetrachloroethylene on a continuous and uniform basis without the necessity of changing the operating conditions to offset changes in the activated carbon.

A satisfactory activated carbon for use in the practice of the present invention is Pittsburgh Activated Carbon Type BL or Type BPL or their equivalents. These products are made and sold by Pittsburgh Activated Carbon Company of Pittsburgh, Pa. The total amount of activated carbon in the system may, of course, be varied within wide limits, provided an adequate total activated carbon surface is immersed in the liquid phase to provide a satisfactory rate of dehydrochlorination. The preferred range is 5% to 20% by weight and the particle size may vary from as coarse as through 4 mesh and retained on 10 mesh to (4 x 10 mesh) finer than through 325 mesh. In most sizes, the activated carbon will be in suspension since the liquid phase is continuously agitated by the escape of the product gases. However, in large scale operations this may be supplemented by mechanical agitation to insure uniformity. The product gases may be cooled by known cooling means while still substantially at operating pressure to give a condensed organic phase low in HCl and an HCl vapor phase low in organic content. HCl in this form is recoverable by known means and is available for other use at essentially operating pressure. The condensed organic liquid phase is removed from the system through a suitable control valve. The condensed organic liquid phase is further processed in known ways to obtain the individual purified and stabilized chlorinated ethylene products.

Where the processes of the present invention are run continuously to produce one or more chlorinated ethylene products, the corresponding feed materials are introduced in amounts corresponding to the amounts of product removed per unit of time from the reactor. This, therefore, permits steady state operation of the reactor. Since HCl is present in the system, it is desirable to operate under essentially anhydrous conditions to avoid possible corrosion of the equipment.

In describing the present invention, several examples have been set forth in which specific operating conditions are specified whereby particular polychlorinated ethanes are dehydrochlorinated in liquid phase under conditions of elevated pressure and temperature to yield chlorinated ethylene compounds and HCl. However, various changes and modifications may be made in such operating conditions without departing from the scope of the invention, including the incorporation or presence in the feed of other polychlorinated ethanes such as dichloroethane and trichloroethane.

We claim:

1. A process for producing a product selected from the group consisting of trichloroethylene, tetrachloroethylene and mixtures thereof from at least one liquid polychlorinated saturated ethane selected from the group consisting of 1,1,2,2 - tetrachloroethane, 1,1,1,2-tetrachloroethane, pentachloroethane and mixtures thereof, said process comprising dehydrochlorinating said polychlorinated saturated ethane in a reaction zone at an elevated temperature in the range of from about 145° C. to below 300° C. in a liquid state while under positive pressure higher than atmospheric pressure in the presence of activated carbon immersed in said polychlorinated saturated ethane, removing the reaction products from the reaction zone as vapors, and separating said dehydrochlorinated product.

2. The process of claim 1 in which the polychlorinated saturated ethanes consist of one or both 1,1,2,2 tetrachloroethane and 1,1,1,2 tetrachloroethane and the dehydrochlorination products consist of trichloroethylene and HCl.

3. The process of claim 1 in which the polychlorinated saturated ethane consists of pentachloroethane and the dehydrochlorination products consist of tetrachloroethylene and HCl.

4. The method of claim 1 wherein the elevated temperature is above 150° C. and below 300° C.

5. The process of claim 1 in which the elevated temperature is in the range from about 190° C. to about 250° C. and the positive pressure is in the range from about 35 p.s.i.a. to about 300 p.s.i.a.

6. The process of claim 1 in which the polychlorinated ethane is tetrachloroethane, in which the operating pressure is maintained in the range from about 70 p.si.a. to about 225 p.s.i.a. and in which the recoverable reaction products consist primarily of trichloroethylene and HCl.

7. The process of claim 1 in which the polychlorinated ethane is pentachloroethane, in which the operating pressure is maintained in the range from about 50 p.s.i.a. to about 200 p.s.i.a. and in which the recoverable reaction products consist primarily of tetrachloroethylene and HCl.

8. The process of claim 1 in which a part of the activated carbon is removed and replaced by a corresponding amount of fresh activated carbon without interrupting the process.

9. The process of claim 1 in which the activated carbon is maintained in suspension in the reaction liquid.

10. The process of claim 1 in which the polychlorinated ethane feed material consists of a mixture of tetrachloroethanes and pentachloroethane and the reaction products consist of trichloroethylene, tetrachloroethylene and HCl.

11. A process for producing a chlorinated ethylene selected from the group consisting of trichloroethylene, tetrachloroethylene and mixtures thereof from at least one liquid polychlorinated saturated ethane selected from the group consisting of 1,1,2,2 tetrachloroethane, 1,1,1,2 tetrachloroethane, pentachloroethane and mixtures thereof comprising dehydrochlorinating the polychlorinated ethane at an elevated temperature in the range of 150° C. to below 300° C. in the liquid state while under positive pressure of 35–300 p.s.i.a. and in the presence of activated carbon immersed in said liquid; continuously removing vapors comprised of HCl, said chlorinated ethylene and said polychlorinated saturated ethane, the mol ratio of chlorinated ethylene vapors to polychlorinated saturated ethane vapors being maintained in the range 0.1 to 10, and recovering said chlorinated ethylene.

References Cited

UNITED STATES PATENTS

| | | | |
|---|---|---|---|
| 3,299,152 | 1/1967 | Inaba et al. | 260—654 D |
| 3,304,336 | 2/1967 | Callahan | 260—654 |

FOREIGN PATENTS

| | | | |
|---|---|---|---|
| 697,482 | 9/1953 | Great Britain | 260—654 D |

LEON ZITVER, Primary Examiner

J. A. BOSKA, Assistant Examiner